(12) United States Patent
Chun

(10) Patent No.: US 6,944,205 B2
(45) Date of Patent: Sep. 13, 2005

(54) METHOD OF DETERMINING AN ACQUISITION INDICATOR BIT IN A COMMUNICATION SYSTEM

(75) Inventor: Joon-Hwa Chun, Lake Grove, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 387 days.

(21) Appl. No.: 10/190,579

(22) Filed: Jul. 9, 2002

(65) Prior Publication Data

US 2004/0008799 A1 Jan. 15, 2004

(51) Int. Cl.$^7$ ................................................. H04B 1/69
(52) U.S. Cl. ...................... 375/141; 375/136; 375/147; 375/316; 370/328; 370/335
(58) Field of Search ................................ 375/130, 136, 375/140, 147, 316, 141, 149; 370/342, 328, 442, 462, 335, 465; 655/553.1

(56) References Cited

U.S. PATENT DOCUMENTS

| | | | |
|---|---|---|---|
| 6,690,712 B2 * | 2/2004 | Kim et al. | 375/146 |
| 6,704,581 B1 * | 3/2004 | Park et al. | 455/553.1 |
| 2004/0001445 A1 * | 1/2004 | Lim et al. | |

OTHER PUBLICATIONS

Schulist, M., et al.: "Link level performance results for a WCDMA random access scheme with preamble power ramping and fast acquisition indication," Vehicular Technology Conference (Fall 1999), pp. 2581–2585.

"Universal Mobile Telecommunications Systems (UMTS); Physical channels and mapping of transport channels onto physical channels (FDD)," 3G TS 25.211 V3.1.1 (1999).

* cited by examiner

*Primary Examiner*—Shuwang Liu
(74) *Attorney, Agent, or Firm*—Barnes & Thornburg; Perry Palan

(57) ABSTRACT

A method of determining an acquisition indicator bit $AI_s$ at a receiver in a communication system which includes receiving multiplexed acquisition indicator bits $y = B \times AI + n$, where B is the signature matrix known at both base station and the receiver, AI is all the acquisition indicator bits and n represents noise. Next, an estimated value of the acquisition indicator bit $A\hat{I}_{ML}(s)$ as a function of $$\sum_j B^T(s, j) \times y(j)$$

is calculated, where $B^T(s,.)$ is the s-th row vector of the transposed matrix $B^T$ for acquisition indicator bit $AI_s$. Finally, the acquisition indicator bit $AI_s$ is set as follows:

$AI_s = -1$, if $A\hat{I}_{ML}(s) < R$ $AI_s = 0$, if $R \leq A\hat{I}_{ML}(s) < U$ $AI_s = 1$, if $A\hat{I}_{ML}(s) \geq U$, where R and U are decision thresholds.

6 Claims, 2 Drawing Sheets

METHOD OF DETERMINING AN ACQUISITION INDICATOR BIT IN A COMMUNICATION SYSTEM

BACKGROUND AND SUMMARY OF THE INVENTION

The present invention relates generally to communication systems of coded data and, more specifically, to an improvement in determining an acquisition indicator bit at a receiver in a communication system.

Although the present invention will be described with respect to $3^{rd}$ generation wideband code division multiple access (3G WCDMA) system, the same method can be used for determining an acquisition bit $AI_s$ at a receiver in other communication systems. General and specific references will also be made to the 3G WCDMA standard 3GPP TS 25.211, Physical channels and mapping of transport channels onto physical channels (FDD) (Release 4) and 3GPP TS 25.213, "Spreading and modulation (FDD)" (Release 4).

In $3^{rd}$ generation CDMA systems, physical connections between UE (User Equipment) and base stations are established through the Physical Random Access Channel (PRACH) and Acquisition Indicator Channel (AICH). The UE transmits PRACH signal that carries the RACH preamble and message to a base station, to request a connection. When the base station recognizes a PRACH preamble, it responds with AICH to UE to indicate if the connection request is granted. An example of the AICH from 3GPP TS 25.211 is shown in FIG. 1.

Upon the AICH reception, the problem is to estimate the $AI_s$ based on the received real valued symbols $a_0, a_1, \ldots, a_{31}$ which are transmitted through AICH, where $AI_s \in \{-1, 0, 1\}$ and $s=0,1, \ldots, 15$. An $AI_s$ of 0 indicates that the signature s is not a member of the set of available signatures. An $AI_s$ of 1 indicates a positive acknowledgement, and an $AI_s$ of $-1$ indicates a negative acknowledgement. At the base station, $AI_s$ is code multiplexed with others, $\{AI_n: n \neq s\}$, by the following formula:

$$a_j = \sum_{s=0}^{15} AI_s b_{s,j}, \quad j = 0, 1, \ldots, 31, \tag{1}$$

where $\{b_{s,j}: j=0,1, \ldots 31\}$ are given in Table 21 in 3GPP TS 25.211 and shown below in the example as $B^T$.

The present invention is a method of determining an acquisition indicator bit $AI_s$ at a receiver in a communication system. The method includes receiving multiplexed acquisition indicator bits $y=B \times AI+n$, where B is the signature matrix known at both base station and the receiver, AI is the set of all the acquisition indicator bits and n represents noise, for example, AWGN (additive white Gaussian noise). Next, an estimated value of the acquisition indicator bit $A\hat{I}_{ML}(s)$ as a function of $$\sum_j B^T(s,j) \times y(j)$$

is calculated, where $B^T(s,.)$ is the s-th row vector of the transposed matrix $B^T$ for acquisition indicator bit $AI_s$. Finally, the acquisition indicator bit $AI_s$ is set as follows:

$AI_s = -1$, if $A\hat{I}_{ML}(s) < R$ $AI_s = 0$, if $R \leq A\hat{I}_{ML}(s) < U$ $AI_s = 1$, if $A\hat{I}_{ML}(s) \geq U$, where R and U are decision thresholds.

The constants R and U may be equal absolute values, for example, $-0.5$ and $0.5$, respectively. The estimated value $A\hat{I}_{ML}(s)$ is calculated by $$A\hat{I}_{ML}(s) = \frac{1}{32} \sum_{j=0}^{31} B^T(s,j) \times y(j).$$

The method is performed without forming a matrix B or $B^T$ and is performed in software.

These and other aspects of the present invention will become apparent from the following detailed description of the invention, when considered in conjunction with accompanying drawings.

DETAILED DESCRIPTION OF THE PREFERRED EMBODIMENTS

Figure 1:
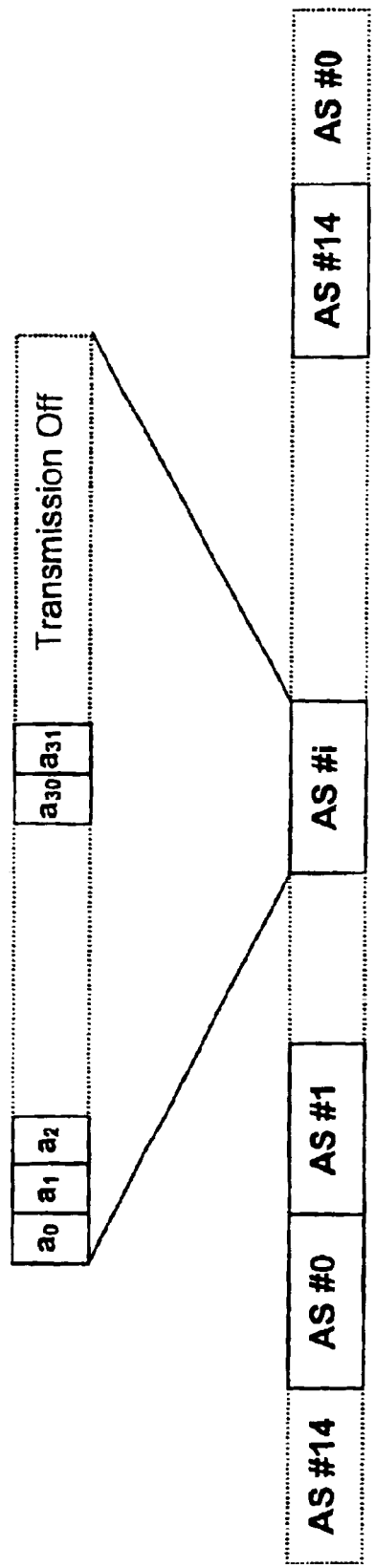
FIG. 1 is a diagram of the structure of the acquisition indicator channel AICH of the 3G WCDMA system defined in 3GPP TS 25.211.
Figure 2:
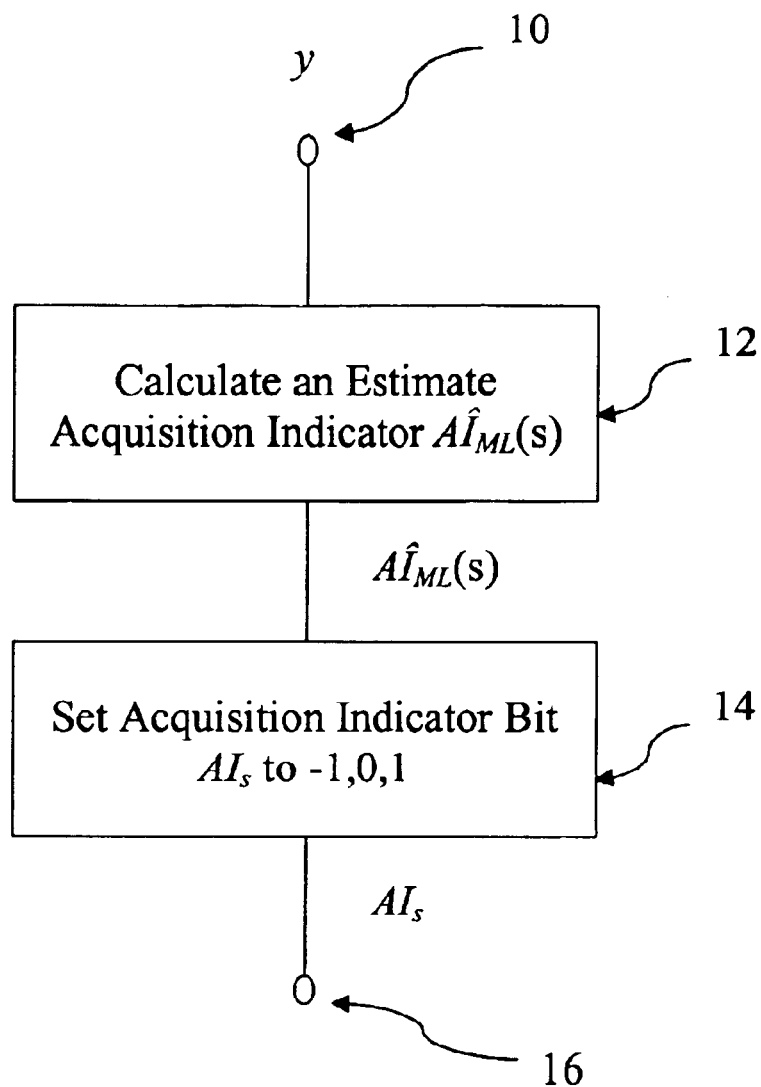
FIG. 2 is a flow chart of a method of determining an acquisition indicator bit $AI_s$ incorporating the principles of the present invention.

The method of the present invention, which is performed at the receiver of a communication system, is illustrated in FIG. 2. The input signal y is received at 10. An estimated acquisition indicator ($A\hat{I}_{ML}(s)$) is calculated from the input signal y. The resulting estimated acquisition indicator corresponding to a signature index s, $A\hat{I}_{ML}(s)$ is then used for determining an acquisition indicator bit $AI_s$ having one of the values $-1,0,1$. The decided acquisition indicator bit is outputted at 16. The details of the method are described as follows:

In matrix form, equation (1) can be expressed as $$a = B \times AI, \tag{2}$$

where $$a = [a_0, a_1, \ldots, a_{31}]^T,$$

$$B = \begin{bmatrix} b_{0,0} & b_{1,0} & b_{2,0} & \ldots & b_{15,0} \\ b_{0,1} & b_{1,1} & b_{2,1} & \ldots & b_{15,1} \\ \vdots & \vdots & \vdots & \vdots & \vdots \\ b_{0,31} & b_{1,31} & b_{2,31} & \ldots & b_{15,31} \end{bmatrix},$$

and $$AI = [AI_0, AI_1, \ldots, AI_{15}]^T.$$

The received soft bits from a rake receiver can be modeled as $$y = a + n$$

or $$y = B \times AI + n, \tag{3}$$

where n denotes noise, for example, the AWGN.

The maximum likelihood estimator for the unknown acquisition indicator, $A\hat{I}_{ML}$, in equation (3) is well known (see S. M. Kay, *Fundamentals of Statistical Signal Processing* (*Estimation Theory*), Prentice Hall) and is given by $$A\hat{I}_{ML} = (B^T \times B)^{-1} \times B^T \times y. \qquad (4)$$

Due to orthogonality (see Table 21 in 3GPP TS 25.211), $$B^T \times B = 32 \times I_{16 \times 16}, \qquad (5)$$

where $I_{16 \times 16}$ is the identity matrix with dimension 16.

Thus, equation (4) can be reduced to $$A\hat{I}_{ML} = \frac{1}{32} \times B^T \times y. \qquad (6)$$

It is assumed that the table index, s, for AICH signature patterns is equivalent to the one for the RACH preamble signatures from Table 3 in 3GPP TS 25.213. In other words, the index s is known at the user equipment UE so that only the portion corresponding to s of equation (6) is of interest.

Let $T^s(y)$ be a statistic corresponding to an index s, given y $$T^s(y) = A\hat{I}_{ML}(s) = \frac{1}{32} \sum_{j=0}^{31} B^T(s,j) \times y(j), \qquad (7)$$

where $B^T(s,.)$ denotes the s-th row vector of the matrix $B^T$.

Assuming uniform prior for the following hypotheses, $H_{-1}: AI_s = -1,$ $H_0: AI_s = 0$ $H_1: AI_s = 1, s = 0, 1, \ldots, 15,$ the 3-ary MAP decision rule (see S. M. Kay, *Fundamentals of Statistical Signal Processing* (*Detection Theory*), Prentice Hall) is to decide $AI_s = -1,$ if $T^s(y) < R$ $AI_s = 0,$ if $R \leq T^s(y) < U$ $AI_s = 1,$ if $T^s(y) \geq U,$ where U and R are constants. The $\{H_i, i=-1,0,1\}$ denote the hypotheses that the acquisition indicator bit is i. Assuming perfect channel, the constants R and U may be equal absolute values, for example, −0.5 and 0.5, respectively.

As an illustrative example, let $AI_0 = -1$, $AI_1 = -1$, $AI_2 = 1$, $AI_3 = -1$, $AI_4 = -1$, $AI_5 = -1$, $AI_6 = -1$, $AI_7 = -1$, $AI_8 = -1$, $AI_9 = -1$, $AI_{10} = -0$, $AI_{11} = -1$, $AI_{12} = -1$, $AI_{13} = -1$, $AI_{14} = -1$, and $AI_{15} = 0$. Since AI is defined by $$AI = [AI_0 AI_1 AI_2 AI_3 AI_4 AI_5 AI_6 AI_7 AI_8 AI_9 AI_{10} AI_{11} AI_{12} AI_{13} AI_{14} AI_{15}]^T,$$

where T denote the transpose, that is $$AI = [-1$$
$$-1$$
$$1$$
$$-1$$
$$1$$
$$-1$$
$$-1$$
$$-1$$
$$-1$$
$$-1$$
$$0$$
$$-1$$
$$-1$$
$$-1$$
$$-1$$
$$0].$$

The matrix B (of size 32×16) in (2) is given by $$B = [1, \ 1, \ 1, \ 1, \ 1, \ 1, \ 1, \ 1, \ 1, \ 1, \ 1, \ 1, \ 1, \ 1, \ 1, \ 1$$
$$1, \ 1, \ 1, \ 1, \ 1, \ 1, \ 1, \ 1, \ 1, \ 1, \ 1, \ 1, \ 1, \ 1, \ 1, \ 1$$
$$1, \ -1, \ 1, \ -1, \ 1, \ -1, \ 1, \ -1, \ 1, \ -1, \ 1, \ -1, \ 1, \ -1, \ 1, \ -1$$
$$1, \ -1, \ 1, \ -1, \ 1, \ -1, \ 1, \ -1, \ 1, \ -1, \ 1, \ -1, \ 1, \ -1, \ 1, \ -1$$
$$1, \ 1, \ -1, \ -1, \ 1, \ 1, \ -1, \ -1, \ 1, \ 1, \ -1, \ -1, \ 1, \ 1, \ -1, \ -1$$
$$1, \ 1, \ -1, \ -1, \ 1, \ 1, \ -1, \ -1, \ 1, \ 1, \ -1, \ -1, \ 1, \ 1, \ -1, \ -1$$
$$1, \ -1, \ -1, \ 1, \ 1, \ -1, \ -1, \ 1, \ 1, \ -1, \ -1, \ 1, \ 1, \ -1, \ -1, \ 1$$
$$1, \ -1, \ -1, \ 1, \ 1, \ -1, \ -1, \ 1, \ 1, \ -1, \ -1, \ 1, \ 1, \ -1, \ -1, \ 1$$
$$1, \ 1, \ 1, \ 1, \ -1, \ -1, \ -1, \ -1, \ 1, \ 1, \ 1, \ 1, \ -1, \ -1, \ -1, \ -1$$
$$1, \ 1, \ 1, \ 1, \ -1, \ -1, \ -1, \ -1, \ 1, \ 1, \ 1, \ 1, \ -1, \ -1, \ -1, \ -1$$
$$1, \ -1, \ 1, \ -1, \ -1, \ 1, \ -1, \ 1, \ 1, \ -1, \ 1, \ -1, \ -1, \ 1, \ -1, \ 1$$
$$1, \ -1, \ 1, \ -1, \ -1, \ 1, \ -1, \ 1, \ 1, \ -1, \ 1, \ -1, \ -1, \ 1, \ -1, \ 1$$
$$1, \ 1, \ -1, \ -1, \ -1, \ -1, \ 1, \ 1, \ 1, \ 1, \ -1, \ -1, \ -1, \ -1, \ 1, \ 1$$
$$1, \ 1, \ -1, \ -1, \ -1, \ -1, \ 1, \ 1, \ 1, \ 1, \ -1, \ -1, \ -1, \ -1, \ 1, \ 1$$
$$1, \ -1, \ -1, \ 1, \ -1, \ 1, \ 1, \ -1, \ 1, \ -1, \ -1, \ 1, \ -1, \ 1, \ 1, \ -1$$
$$1, \ -1, \ -1, \ 1, \ -1, \ 1, \ 1, \ -1, \ 1, \ -1, \ -1, \ 1, \ -1, \ 1, \ 1, \ -1$$
$$1, \ 1, \ 1, \ 1, \ 1, \ 1, \ 1, \ 1, \ -1, \ -1, \ -1, \ -1, \ -1, \ -1, \ -1, \ -1$$
$$1, \ 1, \ 1, \ 1, \ 1, \ 1, \ 1, \ 1, \ -1, \ -1, \ -1, \ -1, \ -1, \ -1, \ -1, \ -1$$
$$1, \ -1, \ 1, \ -1, \ 1, \ -1, \ 1, \ -1, \ -1, \ 1, \ -1, \ 1, \ -1, \ 1, \ -1, \ 1$$
$$1, \ -1, \ 1, \ -1, \ 1, \ -1, \ 1, \ -1, \ -1, \ 1, \ -1, \ 1, \ -1, \ 1, \ -1, \ 1$$
$$1, \ 1, \ -1, \ -1, \ 1, \ 1, \ -1, \ -1, \ -1, \ -1, \ 1, \ 1, \ -1, \ -1, \ 1, \ 1$$
$$1, \ 1, \ -1, \ -1, \ 1, \ 1, \ -1, \ -1, \ -1, \ -1, \ 1, \ 1, \ -1, \ -1, \ 1, \ 1$$
$$1, \ -1, \ -1, \ 1, \ 1, \ -1, \ -1, \ 1, \ -1, \ 1, \ 1, \ -1, \ -1, \ 1, \ 1, \ -1$$
$$1, \ -1, \ -1, \ 1, \ 1, \ -1, \ -1, \ 1, \ -1, \ 1, \ 1, \ -1, \ -1, \ 1, \ 1, \ -1$$
$$1, \ 1, \ 1, \ 1, \ -1, \ -1, \ -1, \ -1, \ -1, \ -1, \ -1, \ -1, \ 1, \ 1, \ 1, \ 1$$
$$1, \ 1, \ 1, \ 1, \ -1, \ -1, \ -1, \ -1, \ -1, \ -1, \ -1, \ -1, \ 1, \ 1, \ 1, \ 1$$
$$1, \ -1, \ 1, \ -1, \ -1, \ 1, \ -1, \ 1, \ -1, \ 1, \ -1, \ 1, \ 1, \ -1, \ 1, \ -1$$
$$1, \ -1, \ 1, \ -1, \ -1, \ 1, \ -1, \ 1, \ -1, \ 1, \ -1, \ 1, \ 1, \ -1, \ 1, \ -1$$
$$1, \ 1, \ -1, \ -1, \ -1, \ -1, \ 1, \ 1, \ -1, \ -1, \ 1, \ 1, \ 1, \ 1, \ -1, \ -1$$
$$1, \ 1, \ -1, \ -1, \ -1, \ -1, \ 1, \ 1, \ -1, \ -1, \ 1, \ 1, \ 1, \ 1, \ -1, \ -1$$
$$1, \ -1, \ -1, \ 1, \ -1, \ 1, \ 1, \ -1, \ -1, \ 1, \ 1, \ -1, \ 1, \ -1, \ -1, \ 1$$
$$1, \ -1, \ -1, \ 1, \ -1, \ 1, \ 1, \ -1, \ -1, \ 1, \ 1, \ -1, \ 1, \ -1, \ -1, \ 1].$$

For instance, $b_{0,0}=1$ and $b_{2,1}=-1$.
The transposed B is then $$B^T = [1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1, \ 1,$$
$$1, \ 1, \ -1, \ -1, \ 1, \ 1, \ -1, \ -1, \ 1, \ 1, \ -1, \ -1, \ 1, \ 1, \ -1, \ -1, \ 1, \ 1, \ -1, \ -1, \ 1, \ 1, \ -1, \ -1, \ 1, \ 1, \ -1, \ -1, \ 1, \ 1, \ -1, \ -1,$$
$$1, \ 1, \ 1, \ 1, \ -1, \ -1, \ -1, \ -1, \ 1, \ 1, \ 1, \ 1, \ -1, \ -1, \ -1, \ -1, \ 1, \ 1, \ 1, \ 1, \ -1, \ -1, \ -1, \ -1, \ 1, \ 1, \ 1, \ 1, \ -1, \ -1, \ -1, \ -1,$$
$$1, \ 1, \ -1, \ -1, \ -1, \ -1, \ 1, \ 1, \ 1, \ 1, \ -1, \ -1, \ -1, \ -1, \ 1, \ 1, \ 1, \ 1, \ -1, \ -1, \ -1, \ -1, \ 1, \ 1, \ 1, \ 1, \ -1, \ -1, \ -1, \ -1, \ 1, \ 1,$$
$$1, \ 1, \ 1, \ 1, \ 1, \ 1, \ 1, \ 1, \ -1, \ -1, \ -1, \ -1, \ -1, \ -1, \ -1, \ -1, \ 1, \ 1, \ 1, \ 1, \ 1, \ 1, \ 1, \ 1, \ -1, \ -1, \ -1, \ -1, \ -1, \ -1, \ -1, \ -1,$$
$$1, \ 1, \ -1, \ -1, \ 1, \ 1, \ -1, \ -1, \ -1, \ -1, \ 1, \ 1, \ -1, \ -1, \ 1, \ 1, \ -1, \ -1, \ 1, \ 1, \ -1, \ -1, \ -1, \ -1, \ 1, \ 1, \ -1, \ -1, \ 1, \ 1,$$
$$1, \ 1, \ 1, \ 1, \ -1, \ -1, \ -1, \ -1, \ -1, \ -1, \ -1, \ -1, \ 1, \ 1, \ 1, \ 1, \ 1, \ 1, \ 1, \ 1, \ -1, \ -1, \ -1, \ -1, \ -1, \ -1, \ -1, \ -1, \ 1, \ 1, \ 1, \ 1,$$
$$1, \ 1, \ -1, \ -1, \ -1, \ -1, \ 1, \ 1, \ -1, \ -1, \ 1, \ 1, \ 1, \ 1, \ -1, \ -1, \ 1, \ 1, \ -1, \ -1, \ -1, \ -1, \ 1, \ 1, \ -1, \ -1, \ 1, \ 1, \ 1, \ 1, \ -1, \ -1,$$
$$1, \ 1, \ 1, \ 1, \ 1, \ 1, \ 1, \ 1, \ 1, \ 1, \ 1, \ 1, \ 1, \ 1, \ 1, \ 1, \ -1, \ -1, \ -1, \ -1, \ -1, \ -1, \ -1, \ -1, \ -1, \ -1, \ -1, \ -1, \ -1, \ -1, \ -1, \ -1,$$
$$1, \ 1, \ -1, \ -1, \ 1, \ 1, \ -1, \ -1, \ 1, \ 1, \ -1, \ -1, \ 1, \ 1, \ -1, \ -1, \ -1, \ -1, \ 1, \ 1, \ -1, \ -1, \ 1, \ 1, \ -1, \ -1, \ 1, \ 1, \ -1, \ -1, \ 1, \ 1,$$
$$1, \ 1, \ 1, \ 1, \ -1, \ -1, \ -1, \ -1, \ 1, \ 1, \ 1, \ 1, \ -1, \ -1, \ -1, \ -1, \ -1, \ -1, \ -1, \ -1, \ 1, \ 1, \ 1, \ 1, \ -1, \ -1, \ -1, \ -1, \ 1, \ 1, \ 1, \ 1,$$
$$1, \ 1, \ -1, \ -1, \ -1, \ -1, \ 1, \ 1, \ 1, \ 1, \ -1, \ -1, \ -1, \ -1, \ 1, \ 1, \ -1, \ -1, \ 1, \ 1, \ 1, \ 1, \ -1, \ -1, \ -1, \ -1, \ 1, \ 1, \ 1, \ 1, \ -1, \ -1,$$
$$1, \ 1, \ 1, \ 1, \ 1, \ 1, \ 1, \ 1, \ -1, \ -1, \ -1, \ -1, \ -1, \ -1, \ -1, \ -1, \ -1, \ -1, \ -1, \ -1, \ -1, \ -1, \ -1, \ -1, \ 1, \ 1, \ 1, \ 1, \ 1, \ 1, \ 1, \ 1,$$
$$1, \ 1, \ -1, \ -1, \ 1, \ 1, \ -1, \ -1, \ -1, \ -1, \ 1, \ 1, \ -1, \ -1, \ 1, \ 1, \ -1, \ -1, \ 1, \ 1, \ -1, \ -1, \ 1, \ 1, \ 1, \ 1, \ -1, \ -1, \ 1, \ 1, \ -1, \ -1,$$
$$1, \ 1, \ 1, \ 1, \ -1, \ -1, \ -1, \ -1, \ -1, \ -1, \ -1, \ -1, \ 1, \ 1, \ 1, \ 1, \ -1, \ -1, \ -1, \ -1, \ 1, \ 1, \ 1, \ 1, \ 1, \ 1, \ 1, \ 1, \ -1, \ -1, \ -1, \ -1, \ 1,$$
$$-1, \ -1, \ 1.$$

From equation (3), $a = B \times AI$.
Note that the size of y, a, B, and AI are $32 \times 1$, $32 \times 1$, $32 \times 16$, and $16 \times 1$, respectively.
The calculated a is then $$a = [-12$$
$$-12$$
$$2$$
$$2$$
$$-4$$
$$-4$$
$$-2$$
$$-2$$
$$2$$
$$2$$
$$4$$
$$4$$
$$-2$$
$$-2$$
$$-4$$
$$-4$$
$$0$$
$$0$$
$$2$$
$$2$$
$$0$$
$$-2$$
$$-2$$
$$2$$
$$2$$
$$0$$
$$0$$
$$-2$$
$$-2$$
$$0$$
$$0].$$

From equation (3), the noise is assumed as the additive white Gaussian. Suppose the noise values are given by $$n = [0.1703$$
$$0.3561$$
$$0.2907$$
$$0.2298$$
$$0.0160$$
$$0.2692$$
$$0.2262$$
$$-0.1017$$
$$-0.1501$$
$$-0.1177$$

-continued $$\begin{aligned}
-0.5866\\
-0.0930\\
0.0471\\
0.1252\\
0.5740\\
-0.1396\\
0.2478\\
0.3177\\
0.3741\\
-0.3945\\
0.0843\\
0.0946\\
-0.4007\\
-0.2951\\
0.4304\\
-0.0523\\
0.1550\\
0.0350\\
-0.2527\\
-0.2225\\
0.1764\\
-0.3777].
\end{aligned}$$

Then from equation (3), the observed samples, y, is $$\begin{aligned}
y = [-11.8297\\
-11.6439\\
2.2907\\
2.2298\\
-3.9840\\
-3.7308\\
-1.7738\\
-2.1017\\
1.8499\\
1.8823\\
3.4134\\
3.9070\\
-1.9529\\
-1.8748\\
-3.4260\\
-4.1396\\
0.2478\\
0.3177\\
2.3741
\end{aligned}$$

-continued $$\begin{aligned}
1.6055\\
0.0843\\
0.0946\\
-2.4007\\
-2.2951\\
2.4304\\
1.9477\\
0.1550\\
0.0350\\
-2.2527\\
-2.2225\\
0.1764\\
-0.3777].
\end{aligned}$$

The y is the noisy version of the received acquisition indicator bits carried over AICH.

Assume that the signature index s is 2, then by equation (3), the $AI_2$ can be estimated as $$A\hat{I}_{ML}(2) = \frac{1}{32}\sum_{j=0}^{31} B^T(2, j) \times y(j)$$
$$= 1/32 * (1 * -11.8297 + 1 * -11.6439 +$$
$$1 * 2.2907 + \ldots - 1 * 0.1764 + -1 * -0.3777) = 1.0434.$$

This is the multiplication of two vectors, the $3^{rd}$ row of $B^T$ and y. Since $A\hat{I}_{ML}(2)$ is greater than 0.5 using U=0.5, the decision can be made as $A\hat{I}(2)=1$, which is matched with the initial setting, $AI_2=1$.

Although the present invention has been described and illustrated in detail, it is to be clearly understood that the same is by way of illustration and example only, and is not to be taken by way of limitation. The scope of the present invention are to be limited only by the terms of the appended claims.

What is claimed:

1. A method of determining an acquisition indicator bit $AI_s$ at a receiver in a communication system, the method comprising:

receiving multiplexed acquisition bits y=B×AI+n, where B is the signature matrix known at both base station and the receiver, AI is all the acquisition indicator bits and n represents noise;

calculating an estimated value of the AI bit of interest $A\hat{I}_{ML}(s)$ as a function of $$\sum_j B^T(s, j) \times y(j),$$

where $B^T(s,.)$ is the s-th row vector of the transposed matrix $B^T$ for acquisition indicator bit $AI_s$; and setting the acquisition indicator bit $AI_s$ as follows:

$AI_s = -1$, if $A\hat{I}_{ML}(s) < R$ $AI_s = 0$, if $R \leq A\hat{I}_{ML}(s) < U$ $AI_s = 1$, if $A\hat{I}_{ML}(s) \geq U$ where R and U are decision thresholds.

2. The method according to claim 1, wherein R and U are equal absolute values.

3. The method according to claim 1, wherein R and U are −0.5 and 0.5, respectively.

4. The method according to claim 1, wherein the estimated value $A\hat{I}_{MMSE}(s)$ is calculated by $$A\hat{I}_{MMSE} = \frac{1}{(32 + \hat{\sigma}^2)} \sum_{j=0}^{31} B^T(s, j) \times y(j).$$

5. The method of claim 1, wherein the method pre-stores matrix B or $B^T$.

6. The method of claim 1, wherein the method is performed in software.

* * * * *

UNITED STATES PATENT AND TRADEMARK OFFICE
CERTIFICATE OF CORRECTION

PATENT NO. : 6,944,205 B2
DATED : September 13, 2005
INVENTOR(S) : Joon-Hwa Chun It is certified that error appears in the above-identified patent and that said Letters Patent is hereby corrected as shown below:

Column 10,
Line 5, change " $A\hat{I}_{MMSE} = \dfrac{1}{(32+\hat{\sigma}^2)}\sum_{j=0}^{31} B^T(s,j) \times y(j)$ " to -- $A\hat{I}_{ML}(s) = \dfrac{1}{32}\sum_{j=0}^{31} B^T(s,j) \times y(j)$ --.

Signed and Sealed this

Ninth Day of May, 2006

JON W. DUDAS
*Director of the United States Patent and Trademark Office*

UNITED STATES PATENT AND TRADEMARK OFFICE
CERTIFICATE OF CORRECTION

PATENT NO.        : 6,944,205 B2
APPLICATION NO.  : 10/190579
DATED             : September 13, 2005
INVENTOR(S)       : Joon-Hwa Chun Page 1 of 1

It is certified that error appears in the above-identified patent and that said Letters Patent is hereby corrected as shown below:

In Column 10, claim 4, at line 2, change "$A\hat{I}_{MMSE}(s)$" to -- $A\hat{I}_{ML}(s)$ --

Signed and Sealed this

Seventh Day of October, 2008

JON W. DUDAS
*Director of the United States Patent and Trademark Office*